United States Patent
Sato et al.

(10) Patent No.: US 7,839,456 B2
(45) Date of Patent: Nov. 23, 2010

(54) VIDEO SIGNAL PROCESSING APPARATUS AND VIDEO SIGNAL PROCESSING METHOD

(75) Inventors: Ku Sato, Ome (JP); Ritsuo Yoshida, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1093 days.

(21) Appl. No.: 11/526,707

(22) Filed: Sep. 26, 2006

(65) Prior Publication Data

US 2007/0070249 A1    Mar. 29, 2007

(30) Foreign Application Priority Data

Sep. 26, 2005 (JP) .............................. 2005-278060

(51) Int. Cl.
*H04N 5/202* (2006.01)
*H04N 9/69* (2006.01)
*H04N 9/77* (2006.01)

(52) U.S. Cl. .................... 348/674; 348/675; 348/712

(58) Field of Classification Search .............. 348/571, 348/708, 649, 651, 671, 673–676, 678, 679, 348/687, 606, 712, 713, 607, 624, 625, 630; 382/167, 162, 254, 266, 274; *H04N 9/64, H04N 5/14, 5/202, 9/69, 5/52, 5/57, 9/77*
See application file for complete search history.

(56) References Cited

U.S. PATENT DOCUMENTS

| | | | | |
|---|---|---|---|---|
| 5,673,355 | A  * | 9/1997 | Strolle et al. | 348/712 |
| 7,420,623 | B2 * | 9/2008 | Nakakuki | 348/630 |
| 2001/0007599 | A1 | 7/2001 | Iguchi et al. | |

FOREIGN PATENT DOCUMENTS

| | | |
|---|---|---|
| JP | 08-125865 | 5/1996 |
| JP | 2000-123165 | 4/2000 |
| JP | 2000-295477 | 10/2000 |
| JP | 2001-032427 | 1/2004 |
| JP | 2005-086772 | 3/2005 |

\* cited by examiner

*Primary Examiner*—Sherrie Hsia
(74) *Attorney, Agent, or Firm*—Pillsbury Winthrop Shaw Pittman, LLP (57) ABSTRACT

According to one embodiment, a video signal processing apparatus includes an acquisition unit to obtain the frequency of each luminance level from the input luminance signal worth of one frame, a frequency conversion unit that logarithmically converts the frequency of each luminance level obtained and adds a preset offset value, a preparation unit that prepares a nonlinear correction processing table to cumulatively add the frequency-converted data and provide nonlinear correction processing for the input luminance signal, and a processor that provides nonlinear correction processing to the input luminance signal in accordance with the prepared nonlinear correction processing table.

13 Claims, 8 Drawing Sheets

VIDEO SIGNAL PROCESSING APPARATUS AND VIDEO SIGNAL PROCESSING METHOD

CROSS-REFERENCE TO RELATED APPLICATIONS

This application is based upon and claims the benefit of priority from Japanese Patent Applications No. 2005-278060, filed Sep. 26, 2005, the entire contents of which are incorporated herein by reference.

BACKGROUND

1. Field

One embodiment of the invention relates to improvement of a video signal processing apparatus and video signal processing method, in which tone correction processing is provided to luminance signals based on the frequency obtained for each luminance level.

2. Description of the Related Art

As everyone knows, in recent years, flat-panel type large screen displays are developed and are put into practical use for color TV broadcast receivers etc. Now, in this kind of large-screen displays, in order to make displayed video images look clear, it is common practice to carry out tone correction processing for luminance components of video signals.

As this kind of tone correction processing for luminance components, a technique to correct tones in accordance with the frequency distribution of the luminance level of input video signals is known. The basic concept of this technique is to increase the gradient of the tone correction characteristic curve for the luminance level with large frequency and to decrease the gradient of the tone correction characteristic curve for the luminance level with small frequency.

By doing this, a dynamic range of a luminance level region occupying most of the input video signal is enlarged. As a result, the contrast feeling of video images is improved or correction is made to effectively express subtle tone differences.

Now, in the current basic tone correction processing means using the frequency of each luminance level, by cumulatively adding the frequency obtained at each luminance level from the low-order luminance level, luminance input/output conversion parameters, that is, a tone correction characteristic curve is prepared.

However, in this kind of tone correction processing means, in the event that information is locally concentrated to a specific luminance level, the luminance gradient of the concentrated portion becomes excessively steep, and conversely, in the portion with no information, the luminance gradient scarcely exists.

On the other hand, presently, it is considered to handle the frequency obtained at each luminance level by establishing limit values for the upper limit and the lower limit, respectively, but since this is a simple omission padding processing, the effects tend to be reduced for the original information.

In Jpn. Pat. Appln. KOKAI Publication No. 2005-86772, there is disclosed a configuration to automatically set a limit value of correction amount of each copy, prepare tone correction characteristics, and carry out tone correction in accordance with the luminance distribution of video image data read, but the correction amount limiting processing or the way to give the setting is complicated.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a video signal processing apparatus includes an acquisition unit to obtain the frequency of each luminance level from the input luminance signal worth of one frame, a frequency conversion unit that logarithmically converts the frequency of each luminance level obtained and adds a preset offset value, a preparation unit that prepares a nonlinear correction processing table to cumulatively add the frequency-converted data and provide nonlinear correction processing for the input luminance signal, and a processor that provides nonlinear correction processing to the input luminance signal in accordance with the prepared nonlinear correction processing table.

Figure 1:
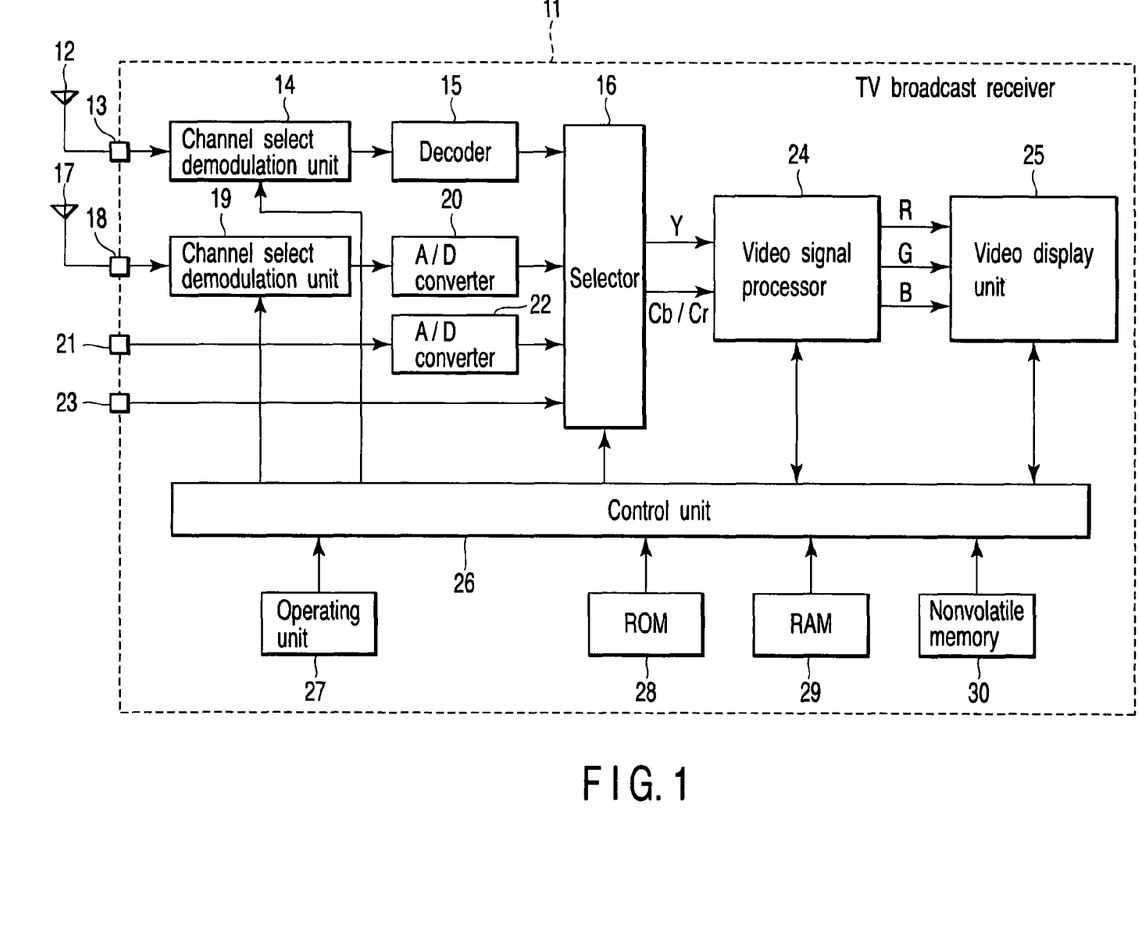
FIG. 1 is a block configuration diagram that indicates one embodiment of the present invention and shown to explain the video signal processing system of a TV broadcast receiver.

FIG. 1 schematically shows a video signal processing system of a TV broadcast receiver 11 to be explained in this embodiment.

That is, digital TV broadcast signals received by an antenna 12 for digital TV broadcast reception is supplied to a channel select demodulation unit 14 via an input terminal 13. This channel select demodulation unit 14 tunes in on a station of broadcast signals of a desired channel from the inputted digital TV signals, and demodulates and outputs this tuned-in-on signal to a decoder 15.

This decoder 15 generates digital luminance signal Y and color signal Cb/Cr, respectively, by providing decode processing to signals inputted from the channel select demodulation unit 14 and output them to a selector 16.

In addition, analog TV broadcast signals received by an antenna 17 for analog TV broadcast reception are supplied to a channel select demodulation unit 19 via an input terminal 18. This channel select demodulation unit 19 tunes in on a station of broadcast signals of a desired channel from the input analog TV signals, and this tuned-in-on signal is demodulated and analog luminance signal Y and color signal Cb/Cr are generated, respectively.

The analog luminance signal Y and color signal Cb/Cr generated at this channel select demodulation unit 19 are supplied to an A/D (analog/digital) converter 20 and converted into digital luminance signal Y and color signal Cb/Cr; then, they are outputted to the selector 16.

In addition, analog luminance signal Y and color signal Cb/Cr supplied to an external output terminal 21 for analog video signals are supplied to an A/D converter 22 and converted into digital luminance signal Y and color signal Cb/Cr; then, they are outputted to the selector 16. Furthermore, digital luminance signal Y and color signal Cb/Cr supplied to an external input terminal 23 for digital video signals are supplied to the selector 16 directly.

Now, this selector 16 selects one from digital luminance signals Y and color signals Cb/Cr supplied from the decoder 15, the A/D converters 20, 22 and the external input terminals 21 and 23, respectively, and supplies the signal to a video signal processor 24.

This video signal processor 24, whose detail will be later discussed, generates R (red), G (green), and B (blue) signals by providing specified signal processing to the inputted digital luminance signals Y and color signals Cb/Cr.

The R, G, and B signals generated at this video signal processor 24 are supplied to a video display unit 25 and used for video display. By the way, for this video display unit 25, a flat panel display comprising, for example, a surface-conduction electron-emitter display, liquid-crystal display, plasma display, etc. is adopted.

Now, this TV broadcast receiver 11 has a variety of operations including various above-mentioned receiving operations integrally controlled by a control unit 26. This control unit 26 is a microprocessor with a built-in central processing unit (CPU), etc. and receives manipulation information from an operating unit 27 including not-illustrated remote controller and controls each unit, respectively, so that the manipulation content is reflected.

In such event, the control unit 26 primarily utilizes read only memory (ROM) 28 which stores a control program executed by the CPU in the control unit 26, random access memory (RAM) 29 that provides the CPU with a work area, and nonvolatile memory 30 in which various kinds of setting information, control information, etc. are stored.

Figure 2:
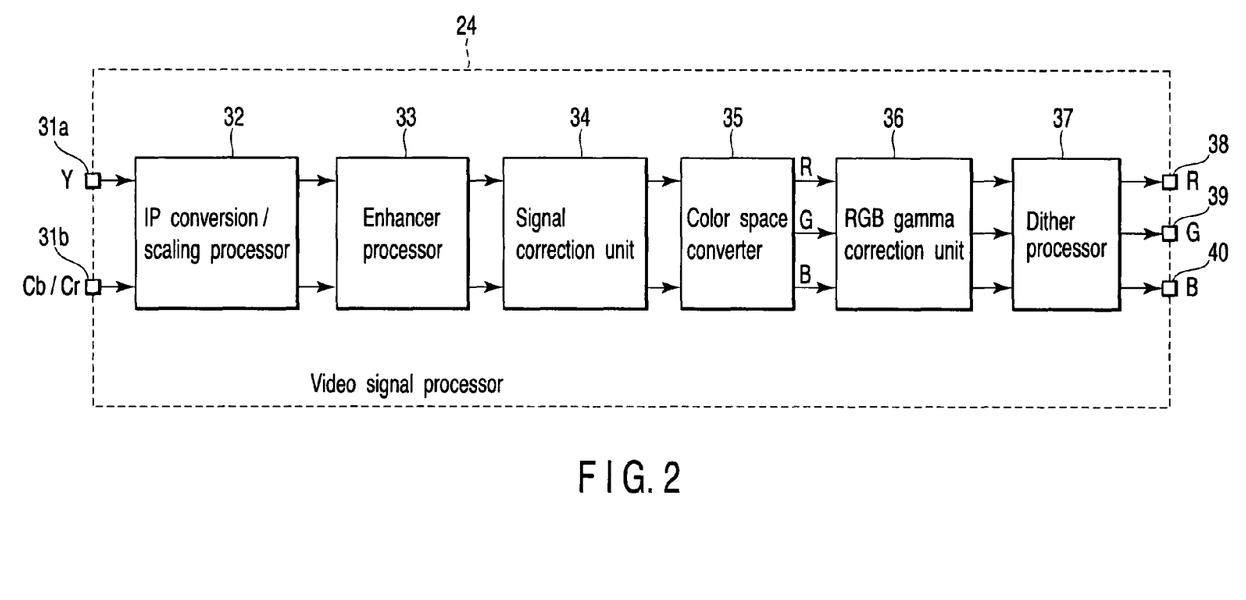
FIG. 2 is a block configuration diagram shown to explain details of the video signal processor of the TV broadcast receiver in the same embodiment.

FIG. 2 shows one example of the video signal processor 24. That is, the digital luminance signal Y and color signal Cb/Cr chosen by the selector 16 are supplied to an interlace progressive (IP) conversion/scaling processor 32 via input terminals 31a and 31b.

This IP conversion/scaling processor 32 provides progressive conversion processing and scaling processing to the inputted luminance signal Y and color signal Cb/Cr in order to display at the video display unit 25 (a flat panel display comprising surface-conduction electron-emitter display, liquid-crystal display, plasma display, etc.) and outputs the signals to an enhancer processor 33.

This enhancer processor 33 provides enhancer processing to the inputted luminance signal Y and color signal Cb/Cr to make rising edges in the vertical and the horizontal directions steep or to vary sharpness and outputs the signal to a signal correction unit 34.

This signal correction unit 34 provides nonlinear correction processing for tone correction to the inputted luminance signal Y and at the same time provides amplitude control processing to the color signal Cb/Cr associated with the nonlinear correction processing, and outputs the signals to a color space converter 35.

This color space converter 35 converts the inputted luminance signal Y and color signal Cb/Cr into R, G, and B signals and outputs the converted signals to an RGB gamma correction unit 36. This RGB gamma correction unit 36 provides white balance adjustment to the inputted R, G, and B signals and at the same time provides gamma correction processing to the video display unit 25, and output the processed signals to a dither processor 37.

This dither processor 37 provides the inputted R, G, and B signals with compression processing to convert high-tone bit expression with bit-number extended to enhance expression into a low-tone bit number corresponding to the video display unit 25, and then, outputs the signals to the video display unit 25 via output terminals 38, 39, and 40.

Figure 3:
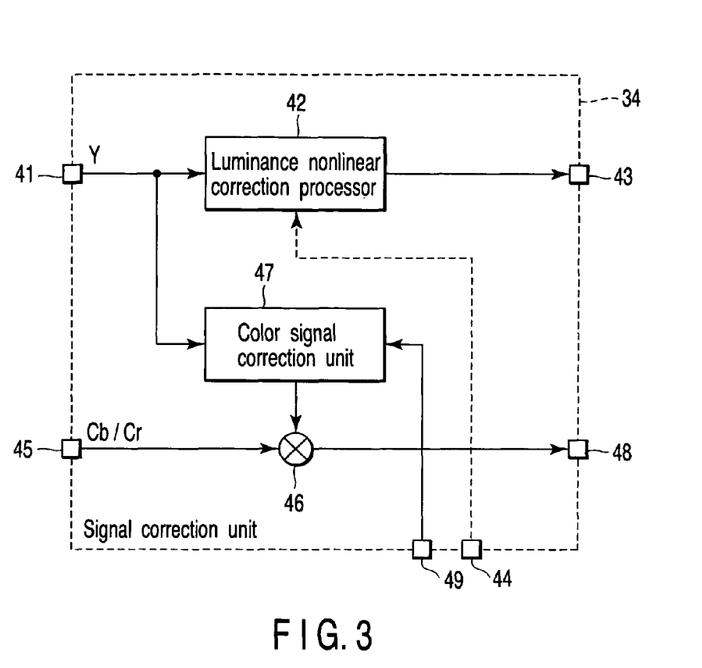
FIG. 3 is a block configuration diagram shown to explain details of the signal correction unit of the video signal processor in the same embodiment.

FIG. 3 shows one example of the signal correction unit 34. That is, the luminance signal Y outputted from the enhancer processor 33 is supplied to a luminance nonlinear correction processor 42 via an input terminal 41, and, after undergoing nonlinear correction processing for tone correction, is outputted to the color space converter 35 via an output terminal 43.

Now, the luminance nonlinear correction processor 42, whose detail will be later discussed, prepares an LUT (look-up table) for luminance nonlinear correction processing in accordance with the control data supplied from the control unit 26 via a control terminal 44, and carries out nonlinear correction processing to the luminance signal Y based on this LUT.

In addition, the color signal Cb/Cr outputted from the enhancer processor 33 is supplied to a multiplier 46 via an input terminal 45 and provided with amplitude control processing by multiplying the color signal by a color correction signal outputted from a color signal correction unit 47. Then, it is outputted to the color space converter 35 via an output terminal 48.

This color signal correction unit 47 searches for color correction signals which serve as color gains to carry out amplitude control for color signals Cb/Cr on the basis of the level of the luminance signal Y supplied from the color correction processing LUT supplied from the control unit 26 via the control terminal 49 to the input terminal 41 and outputs the signals to the multiplier 46.

Figure 4:
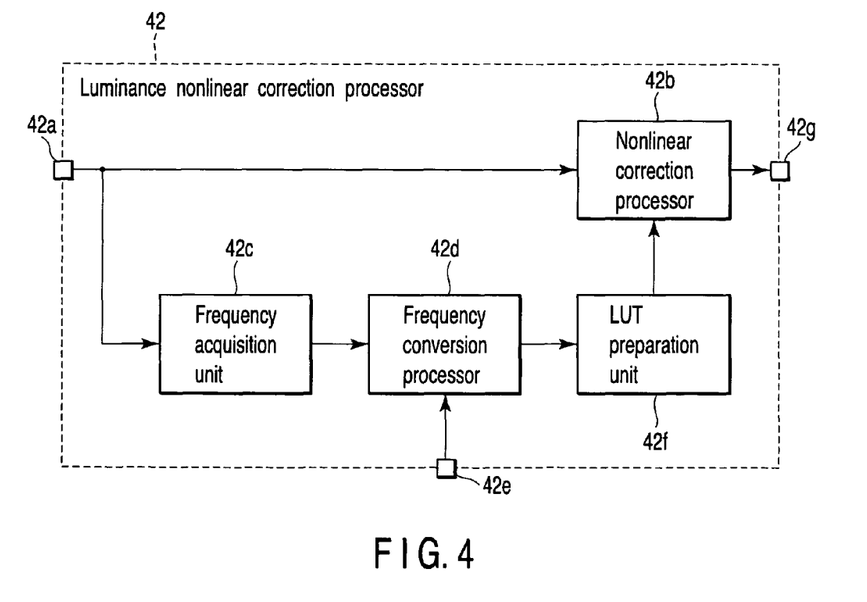
FIG. 4 is a block configuration diagram shown to explain details of a luminance nonlinear correction processor of the signal correction unit in the same embodiment.

FIG. 4 shows the details of the luminance nonlinear correction processor 42. That is, the luminance signal Y supplied to the input terminal 41 is supplied to the nonlinear correction processor 42b after going through the input terminal 42a and at the same time, supplied to a frequency acquisition unit 42c. Among these elements, the frequency acquisition unit 42c obtains the frequency for every luminance level to the luminance signal worth of 1 frame inputted.

Then, the frequency acquired at this frequency acquisition unit 42c is supplied to a frequency conversion processor 42d. This frequency conversion processor 42d, whose details will be later discussed, provides the frequency of each inputted luminance level with frequency conversion processing on the basis of the control data supplied from the control unit 26 via control terminals 44 and 42e, and outputs the frequency to an LUT preparation unit 42f.

This LUT preparation unit 42f prepares an LUT for luminance nonlinear correction processing on the basis of the data after frequency conversion processing outputted from the frequency conversion processor 42d, and outputs the LUT to the nonlinear correction processor 42b. Then, this nonlinear correction processor 42b provides nonlinear correction processing to the inputted luminance signal Y in accordance with the LUT and outputs the signal to the color space converter 35 via output terminals 42g and 43.

Figure 5:
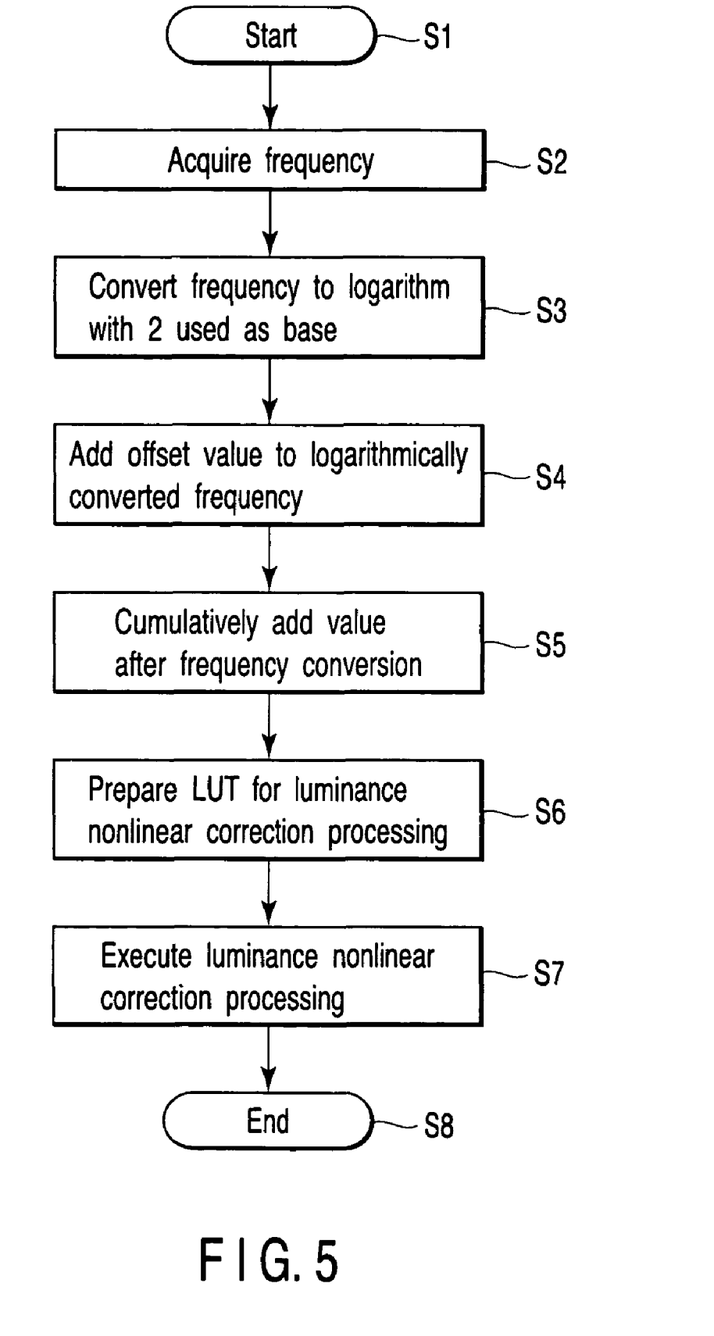
FIG. 5 is a flow chart shown to explain processing action of the luminance nonlinear correction processor in the same embodiment.

FIG. 5 shows a flow chart which summarizes a series of nonlinear correction processing operations which the luminance nonlinear correction processor 42 provides to the luminance signal Y. That is, when processing is started (Block S1), the frequency acquisition unit 42c obtains the frequency for each luminance level, respectively, in Block S2.

This frequency can be obtained by dividing a dynamic range of the luminance level into n levels and counting the pixel count that corresponds to each luminance level 1 through n for the video signal worth of one frame. In such event, the resolution of the luminance levels 1 through n should be set thoroughly finely. For example, in the event that the input video signal is 8 bits, the resolution of the luminance level when the frequency is obtained should be 8 bits.

Figure 6:
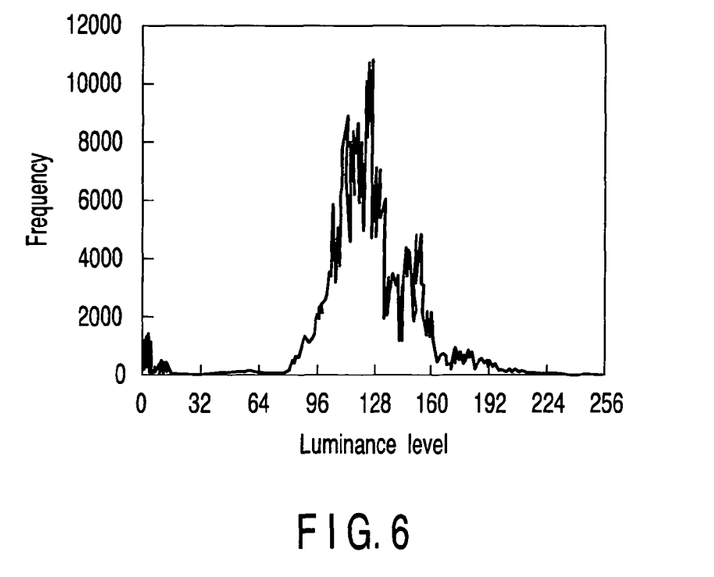
FIG. 6 is a diagram shown to explain the frequency of each luminance level worth of one frame which the luminance nonlinear correction processor acquires in the same embodiment.

FIG. 6 shows one example of the frequency for each luminance level obtained from one frame of the video signal of 720 pixels in the horizontal direction and 480 pixels in the vertical direction. In this case, the resolution of the luminance level is set to 8 bits (0-255). That is, the number of pixels which correspond to each of 256 luminance levels from 0 to 255, respectively, are obtained. Consequently, to add all the frequencies at each luminance level, the total becomes same as the number of pixels (720×480=345,600) worth of one frame which the input video signal possesses.

Thereafter, the frequency conversion processor 42d executes frequency conversion processing to the frequency of each luminance level obtained on the basis of the control data supplied from the control unit 26. First of all, the frequency conversion processor 42d converts the frequency of each luminance level to logarithms with 2 used as a base, respectively, at Block S3.

Figure 7:
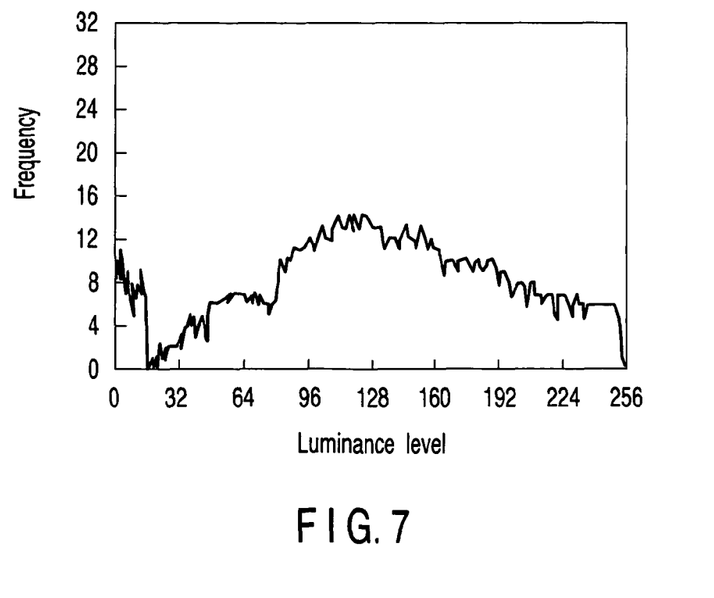
FIG. 7 is a diagram shown to explain the frequency with logarithmic conversion processing provided with 2 used as the base in the same embodiment.

This logarithmic conversion processing with 2 used as a base means, to be concrete, to carry out right bit shift arithmetic processing to the frequency of each luminance level until zero is reached, respectively, and to output the number of divisions carried out until zero is reached as the logarithmically converted frequency. As described above, the frequency shown in FIG. 6 is frequency-converted as shown in FIG. 7 by providing logarithmic conversion processing with 2 used as a base.

In this case, the bit shift calculation can achieve remarkably high-speed processing, and to think of the case in which the frequency of 8-bit tone obtained from a video signal comprising the total pixel count of 345,600 (720×480) as described above is processed, the number of bit shift calculations is about 3000 times at maximum, and this could be sufficiently executable processing when it is carried out as picture quality correction by software, too.

Figure 8:
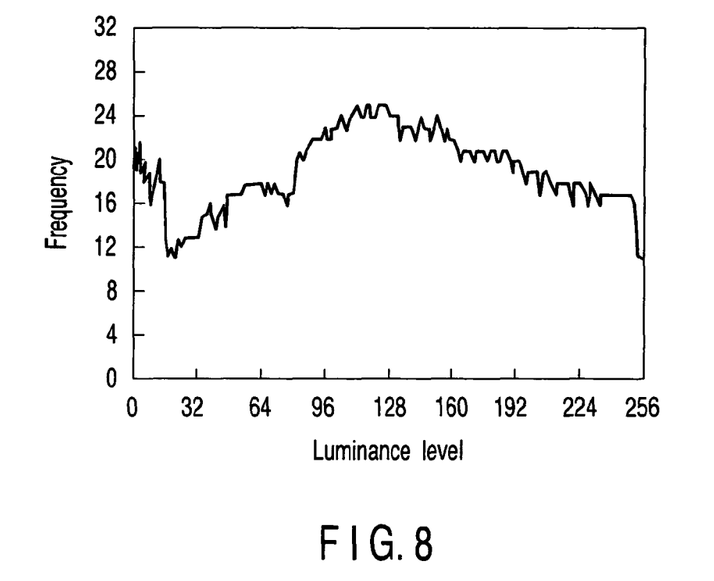
FIG. 8 is a diagram shown to explain the data after logarithmic conversion processing with the offset value added in the same embodiment.

Thereafter, the frequency conversion processor 42d adds a specified offset value to the frequency after the logarithmic conversion processing at Block S4. This offset value is the value (about 10.4) obtained by providing logarithmic conversion processing with 2 used as a base to the value (1350) obtained by dividing the total pixel count (345600) by the luminance tone number (256). In this manner, the logarithmically converted frequency shown in FIG. 7 is shifted by as much as the offset value as shown in FIG. 8.

By the way, for this offset value, values pre-operated in accordance with pixel counts of input video signals are stored in the above-described nonvolatile memory 30. That is, the offset value (about 10.4) that corresponds to the pixel count (standard picture quality) comprising 720×480, the offset value (about 13) that corresponds to the pixel count (high picture quality) comprising 1920 pixels in the horizontal direction×1080 pixels in the vertical direction (=2073600), etc. are prepared in the nonvolatile memory 30 in advance. Then, the offset value that corresponds to the pixel count of the input video signal is read by the control unit 26 and is supplied to the frequency conversion processor 42d via control terminals 44, 42e as control data.

Figure 9:
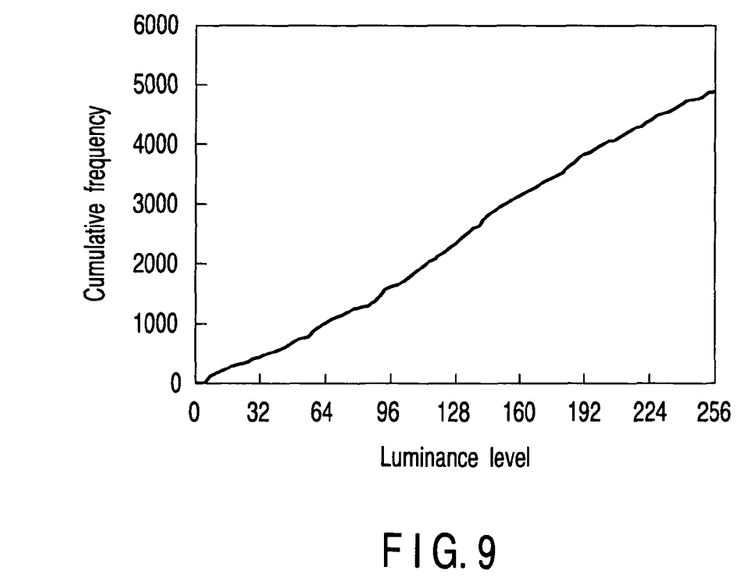
FIG. 9 is a diagram shown to explain the results of cumulatively adding the data after frequency conversion processing from the lower luminance level in the same embodiment.

When frequency conversion processing is carried out in this way, then, the LUT preparation unit 42f successively cumulatively adds the data after frequency conversion outputted from the frequency conversion processor 42d at Block S5 in the direction to increase the luminance tone from the low-order luminance level. In this manner, the cumulative additional value of each luminance level as shown in FIG. 9 can be obtained.

Figure 10:
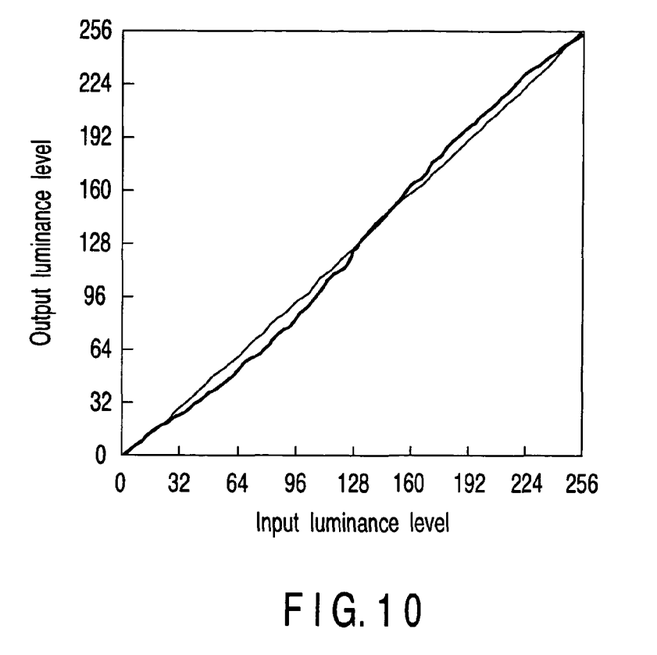
FIG. 10 is a diagram shown to explain LUT for luminance nonlinear correction processing prepared from the data after frequency conversion processing in the same embodiment.

Thereafter, the LUT preparation unit 42f prepares luminance input/output conversion parameters, that is, an LUT for luminance nonlinear correction processing as shown in FIG. 10, by normalizing the cumulative additional value with the 8-bit tone level at Block S6. Then, the nonlinear correction processor 42b provides nonlinear corrosion processing to the luminance signal Y on the basis of the LUT prepared by the LUT preparation unit 42f at Block S7 and ends processing (Block S8).

The LUT for luminance nonlinear correction processing shown in FIG. 10 has a characteristic to increase the gradient in the vicinity of the intermediate luminance level with a large number of frequency of FIG. 6, and by carrying out nonlinear correction processing for the luminance signal Y using this characteristic, contrast of video image in the intermediate luminance level portion can be improved.

According to the above-mentioned embodiment, only carrying out frequency conversion processing by remarkably simple arithmetic processing with a small calculation amount, that is, logarithmic conversion processing with 2 used as a base to the frequency of every luminance level and adding a specified offset value to this converted value for one frame of input video signals, it is possible to provide optimum tone correction processing to the input video signals.

In addition, by multiplying the offset value to be added to the logarithmically converted frequency by a specified coefficient, it is possible to make the luminance linear correction characteristics variable. For example, in the event that the value obtained by multiplying coefficients 0.5, 0.25, and 0 by the value (about 10.4) obtained by providing logarithmic conversion processing with 2 used as the base to the value (1350) obtained by dividing the total pixel count (345600) by the luminance tone number (256) is added to the logarithmically converted frequency as an offset value, the LUT for luminance nonlinear correction processing has the characteristics made variable as shown in FIGS. 11, 12, and 13.

Figure 11:
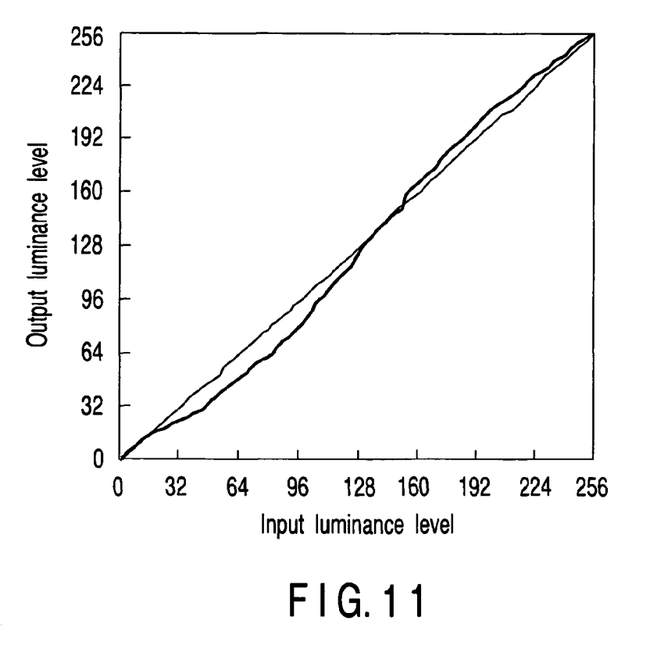
FIG. 11 is a diagram shown to explain LUT for luminance nonlinear correction processing when the first coefficient is multiplied by the offset value in the same embodiment.
Figure 12:
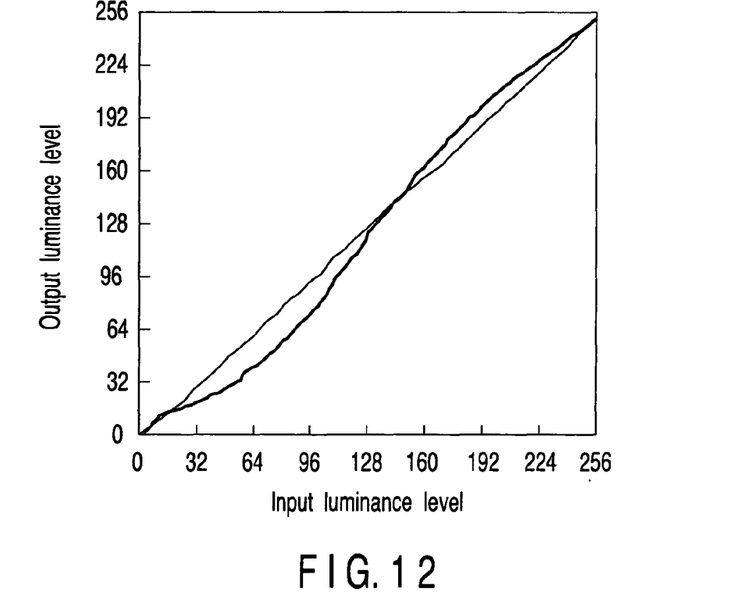
FIG. 12 is a diagram shown to explain LUT for luminance nonlinear correction processing when the second coefficient is multiplied by the offset value in the same embodiment.
Figure 13:
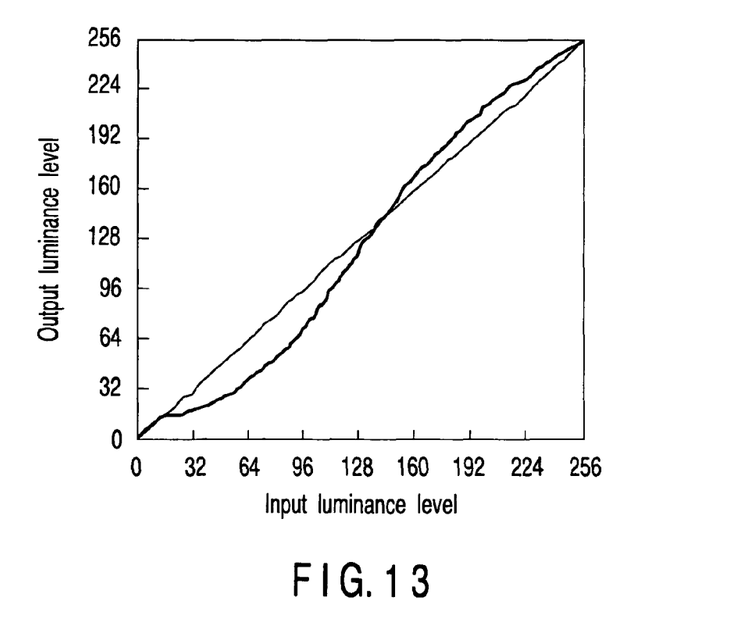
FIG. 13 is a diagram shown to explain LUT for luminance nonlinear correction processing when the third coefficient is multiplied by the offset value in the same embodiment.

As clear from comparison of the characteristics shown in FIGS. 11, 12, and 13, the magnitude of correction effects is varied in accordance with coefficients to be multiplied. In this way, by simple arithmetic processing only by multiplying the offset value by a coefficient, it becomes possible to easily vary the strength of luminance nonlinear correction processing, and it can be used, for example, for selection of picture quality mode by user manipulation.

Now, in the embodiment described above, logarithmic conversion processing with 2 used as a base was provided for the frequency of every luminance level obtained from the input video signal, but if there is any allowance in the performance of the arithmetic processing or comprehensive arithmetic processing, it is possible to carry out general logarithmic conversion processing of cases other than that with 2 used as the base, too.

In addition, with respect to the offset value to be added to the logarithmically converted frequency, the total pixel count was divided by the luminance tone number to obtain the divided value by logarithmic conversion, but it is needless to say that the present invention should not be limited to this.

Furthermore, the offset value to be added to the logarithmically converted frequency may not be constant but may be varied in accordance with the luminance level. In addition, when the frequency is obtained, it is possible to include a process to remove the frequency equivalent to the specific luminance level or others, too.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video signal processing apparatus, comprising:
    an input unit configured in such a manner that luminance signals are inputted;
    an acquisition unit configured to obtain a frequency for each luminance level for the luminance signal worth of one frame inputted in the input unit;
    a frequency conversion unit configured to logarithmically convert the frequency of each luminance level obtained by the acquisition unit and add a preset offset value to this converted value;
    a preparation unit configured to prepare a nonlinear correction processing table to provide nonlinear correction processing to the luminance signal inputted into the input unit by cumulatively adding the data which underwent frequency conversion processing at the frequency conversion unit; and
    a processor configured to provide nonlinear correction processing to the luminance signal inputted into the input unit based on the nonlinear correction processing table prepared by the preparation unit.

2. A video signal processing apparatus according to claim 1, wherein
    the frequency conversion unit is configured to provide logarithmic conversion processing with 2 used as the base for the frequency of each luminance level obtained at the acquisition unit.

3. A video signal processing apparatus according to claim 1, wherein
    the frequency conversion unit is configured to add a preset offset value in accordance with each luminance level to a value found by logarithmically converting the frequency of each luminance level obtained at the acquisition unit.

4. A video signal processing apparatus according to claim 1, wherein
    the frequency conversion unit is configured in such a manner that all the pixel counts of input video are divided by the number of tones and the value obtained by logarithmically converting this divided value is used as the offset value.

5. A video signal processing apparatus according to claim 1, wherein
    the frequency conversion unit is configured to automatically change the offset value in accordance with the pixel count of the input video.

6. A video signal processing apparatus according to claim 1, wherein
    the frequency conversion unit is configured to change nonlinear correction characteristics with respect to the luminance signal by multiplying the offset value added to the logarithmically converted value by a specified coefficient.

7. A video signal processing apparatus comprising:
    an input unit configured in such a manner that luminance signals are inputted;
    an acquisition unit configured to obtain a frequency for each luminance level for the luminance signal worth of one frame inputted in the input unit;
    a frequency conversion unit configured to provide logarithmic conversion processing with 2 used as the base for the frequency of each luminance level obtained at the acquisition unit;
    a preparation unit configured to prepare a nonlinear correction processing table to provide nonlinear correction processing to the luminance signal inputted into the input unit by cumulatively adding the data which underwent frequency conversion processing at the frequency conversion unit; and
    a processor configured to provide nonlinear correction processing to the luminance signal inputted into the input unit based on the nonlinear correction processing table prepared by the preparation unit.

8. A video signal processing method comprising:
    a first step of inputting luminance signals;
    a second step of obtaining a frequency for each luminance level for the luminance signals worth of one frame inputted in the first step;
    a third step of logarithmically converting the frequency of each luminance level obtained in the second step and adding a preset offset value to this converted value;
    a fourth step of preparing a nonlinear correction processing table to provide nonlinear correction processing to the luminance signal inputted in the first step by cumulatively adding the data which underwent the frequency conversion processing in the third step; and
    a fifth step of providing nonlinear correction processing to the luminance signal inputted in the first step based on the nonlinear correction processing table prepared in the fourth step.

9. A video signal processing method according to claim 8, wherein the third step provides logarithmic conversion processing with 2 used as the base to the frequency of each luminance level obtained in the first step.

10. A video signal processing method according to claim 8, wherein the third step adds a preset offset value in accordance with each luminance level to the value obtained by logarithmically converting the frequency of each luminance obtained in the second step.

11. A video signal processing method according to claim 8, wherein the third step divides all the pixel counts of the inputted video by the number of tones of the luminance level and uses the value obtained by logarithmically converting this divided value as the offset value.

12. A video signal processing method according to claim 8, wherein the third step automatically changes the offset value in accordance with the pixel count of the inputted video.

13. A video signal processing method according to claim 8, wherein the third step changes nonlinear correction characteristics with respect to the luminance signal by multiplying a specified coefficient by the offset value to be added to the logarithmically converted value.

* * * * *